United States Patent
Kusatani

(10) Patent No.: US 12,492,957 B2
(45) Date of Patent: Dec. 9, 2025

(54) TORQUE SENSOR FAULT DETECTION METHOD

(71) Applicant: Honda Motor Co., Ltd., Tokyo (JP)

(72) Inventor: Masaya Kusatani, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 289 days.

(21) Appl. No.: 18/172,289

(22) Filed: Feb. 21, 2023

(65) Prior Publication Data
US 2023/0314255 A1 Oct. 5, 2023

(30) Foreign Application Priority Data
Mar. 30, 2022 (CN) .......................... 202210321669.5

(51) Int. Cl.
| | | |
|---|---|---|
| *G01L 25/00* | (2006.01) | |
| *B62D 6/10* | (2006.01) | |
| *G01L 5/22* | (2006.01) | |

(52) U.S. Cl.
CPC .............. *G01L 25/003* (2013.01); *B62D 6/10* (2013.01); *G01L 5/221* (2013.01)

(58) Field of Classification Search
CPC ......... G01L 25/003; G01L 5/221; B62D 6/10; B62D 6/04; B62D 5/049
See application file for complete search history.

(56) References Cited

U.S. PATENT DOCUMENTS

| | | | | |
|---|---|---|---|---|
| 5,528,497 A | * | 6/1996 | Yamamoto | B62D 6/04 701/41 |
| 5,927,430 A | * | 7/1999 | Mukai | B62D 5/049 701/41 |
| 6,018,691 A | * | 1/2000 | Yamamoto | B62D 6/008 180/404 |
| 6,148,949 A | * | 11/2000 | Kobayashi | B62D 6/10 180/404 |
| 10,035,538 B2 | * | 7/2018 | Akatsuka | B62D 15/025 |
| 12,252,020 B2 | * | 3/2025 | Zang | B60L 3/0038 |
| 2018/0297631 A1 | | 10/2018 | Miyatani et al. | |

FOREIGN PATENT DOCUMENTS

| | | | | |
|---|---|---|---|---|
| CN | 101177146 A | * | 5/2008 | ........... B62D 5/0463 |
| CN | 108137093 | | 6/2018 | |
| EP | 2263928 B1 | * | 4/2013 | ........... B62D 5/0463 |
| EP | 3246227 B1 | * | 5/2019 | ........... B62D 5/0463 |

(Continued)

OTHER PUBLICATIONS

"Office Action of China Counterpart Application", issued on Oct. 12, 2025, with English translation thereof, p. 1-p. 13.

*Primary Examiner* — Octavia Hollington
(74) *Attorney, Agent, or Firm* — JCIPRNET

(57) ABSTRACT

A torque sensor fault detection method is provided. When a torque sensor is normal when a vehicle is going straight, the torque sensor points to a torque midpoint, but when the vehicle is going straight on an inclined road, the torque midpoint is offset due to the slope of the road surface, and the torque sensor is mistakenly detected to be faulty. If a direction of a rudder angle is opposite to an offset direction of a detection value of the torque sensor, it may be judged that the torque sensor is faulty. If the two are in the same direction, the vehicle is travelling on the inclined road, and it may be judged that the torque sensor is normal, without being mistakenly detected to be faulty.

2 Claims, 4 Drawing Sheets

(56) References Cited

FOREIGN PATENT DOCUMENTS

| | | | |
|---|---|---|---|
| JP | H1159447 | | 3/1999 |
| JP | 3055752 | | 6/2000 |
| JP | 2012062022 A | * | 3/2012 |
| JP | 52152173 B2 | * | 6/2013 |
| JP | 2014004920 A | * | 1/2014 |

* cited by examiner

TORQUE SENSOR FAULT DETECTION METHOD

CROSS-REFERENCE TO RELATED APPLICATION

This application claims the priority benefit of China application serial no. 202210321669.5, filed on Mar. 30, 2022. The entirety of the above-mentioned patent application is hereby incorporated by reference herein and made a part of this specification.

BACKGROUND

Technical Field

The disclosure relates to a fault detection method, and in particular to a torque sensor fault detection method in an electric power steering device.

Description of Related Art

A steering force applied to a steering wheel by an operator is detected through a torque sensor installed on a steering shaft connected to the steering wheel. Based on the steering force (steering torque) detected by the torque sensor, in the electric power steering device, an electric motor is driven by a control device, and an assist torque generated by the electric motor is transmitted to the steering shaft (steering system) via a turbo retardation mechanism, etc., so that the steering force by the operator on the steering wheel is reduced.

In this case, as the torque sensor, as shown in Japanese Patent No. 3055752 (JP3055752B2), the following configuration is known. An input shaft and an output shaft are connected by a torsion bar, and a magnet engaging the input shaft and the output shaft is disposed. When a torque acts between the input and output shafts, the magnet is displaced, and the displacement of the magnet is electrically detected through a detection coil.

In Japanese Application No. 9-231452 (JPH09-231452), the following technology is provided. In an electric power steering (EPS) device that generates an assist steering force to assist steering based on a steering torque detected by a torque sensor. Whether the torque sensor is normal or defective is determined according to the steering torque, the vehicle speed, and the steering angle.

Although the prior art can detect the fault of the torque sensor when a mechanical fault of a torque sensor component inside the torque sensor occurs (for example, when the magnet installed for detecting the rotational speed inside the torque sensor is displaced). However, under driving conditions where the torque sensor points to points other than the midpoint, the torque sensor may be mistakenly detected to be faulty.

Although there is a stop structure in the torque sensor, when the magnet is peeled off, there will be an offset of about 3 to 4 newton meters (Nm), maintaining the unbalanced state of the steering force, and at this time, automatic steering will occur if let go. Due to the mechanical fault, the torque sensor receives an electrical normal signal, so the fault cannot be detected.

SUMMARY

The disclosure provides a torque sensor fault detection method, which is applicable to a control device with electric power steering equipped with a torque sensor. The torque sensor detects a steering torque and a rudder angle according to an operating amount of a steering disposed on a vehicle. The method includes the following steps. The control device judges whether the vehicle is going straight according to a yaw rate detection device for detecting a vehicle yaw rate, the torque sensor, and a vehicle speed of the vehicle, and judges an offset of the torque sensor by the steering torque. In the judgement of the offset, a torque detection range of the torque sensor is set to include a first direction offset to one side and a second direction offset to another side from a torque midpoint of a detection value of the torque sensor, and it is judged that the torque sensor is faulty when a direction in which the steering torque is generated is opposite to a detection direction within the torque detection range. The detection direction is judged through comparing the rudder angle with the torque detection range.

DETAILED DESCRIPTION OF DISCLOSED EMBODIMENTS

In the case where a large torque occurs when a vehicle is going straight, the large torque may be identified as an offset fault, and a backup control when the torque sensor fails is executed instead.

The disclosure provides a torque sensor fault detection method, which is applicable to a control device with electric power steering equipped with a torque sensor. The torque sensor detects a steering torque and a rudder angle according to an operating amount of a steering disposed on a vehicle. The method includes the following steps. The control device judges whether the vehicle is going straight according to a yaw rate detection device for detecting a vehicle yaw rate, the torque sensor, and a vehicle speed of the vehicle, and judges an offset of the torque sensor by the steering torque. In the judgement of the offset, a torque detection range of the torque sensor is set to include a first direction offset to one side and a second direction offset to another side from a torque midpoint of a detection value of the torque sensor, and it is judged that the torque sensor is faulty when a direction in which the steering torque is generated is opposite to a detection direction within the torque detection range. The detection direction is judged through comparing the rudder angle with the torque detection range.

In the torque sensor fault detection method according to an embodiment of the disclosure, when the detection value of the torque sensor is the first direction, the torque detection range of the torque sensor is greater in the second direction than in the first direction; and when the detection value of the torque sensor is the second direction, the torque detection range is greater in the first direction than in the second direction.

The torque sensor fault detection method according to an embodiment of the disclosure includes the following step. When the yaw rate detection device detects that the yaw rate is equal to or higher than a threshold value, the control device does not execute fault detection of the torque sensor.

Through the above method, the disclosure can prevent the unbalanced state of the steering force from continuing, and prevent automatic steering after letting go.

Hereinafter, embodiments of the disclosure will be described with reference to the drawings.

Figure 1:
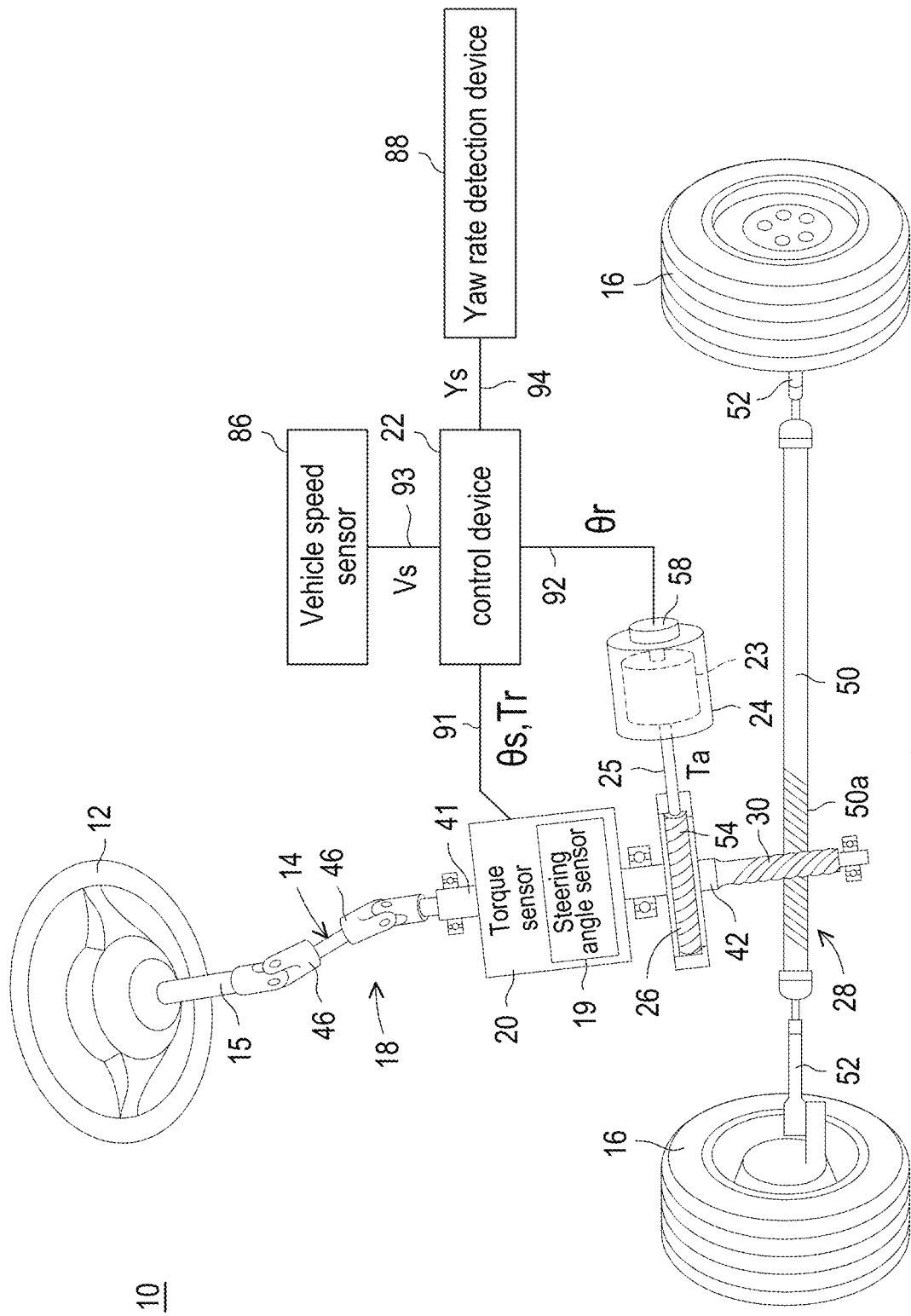
FIG. 1 is an overall schematic configuration diagram of an electric power steering device mounted on a vehicle according to an embodiment of the disclosure.

FIG. 1 is an overall schematic configuration diagram of an electric power steering (EPS) device mounted on a vehicle according to an embodiment of the disclosure.

As shown in FIG. 1, an electric power steering device 10 basically includes a steering system 18 from a steering wheel 12 (an operating member operated by a driver to manipulate the vehicle) to a rotating wheel 16 via steering shafts 14 and 15; a torque sensor 20 disposed on a rotating axis of the steering system 18 and having a steering angle sensor 19 inside, and detecting a torque Tr and a steering angle θs of the rotating axis; a control device 22 determining an assist torque Ta based on an output, etc. from the torque sensor 20; and a brushless motor, that is, an electric motor 24 driven by the control device 22. The motor 24 may also be a motor with brushes.

The torque sensor 20 has a well-known structure as follows. An input shaft 41 and an output shaft 42 respectively used as the rotating axis of the steering system 18 are internally connected by the torsion bar. Two detection coils (not shown) supported by a casing are configured to surround a cylindrical magnet (not shown) engaged with the input and output shafts 41 and 42.

The steering angle sensor 19 has a known configuration for using a rotation angle of the input shaft 41 as the steering angle θs for detection.

Signals of the torque Tr and the steering angle θs used as output signals of the torque sensor 20 and the steering angle sensor 19 are supplied to the control device 22 through a wire harness 91.

The steering wheel 12 is formed by connecting the main steering shaft 15, the input shaft 41, and the output shaft 42 respectively used as rotation axes, wherein the main steering shaft 15 is integrally combined with the steering wheel 12, the input shaft 41 is combined with the main steering shaft 15 via a universal joint 46, and the output shaft 42 is provided with a rack and a pinion 30 of a pinion mechanism 28.

A lower end of the output shaft 42 is provided with the pinion 30. The pinion 30 meshes with rack teeth 50a of a rack shaft 50 that can reciprocate in the direction of the vehicle width. At two ends of the rack shaft 50, left and right front wheels, that is, the rotating wheels 16 are connected via a coupling rod 52.

In more detail, the steering system 18 includes the steering shaft 14 (the main steering shaft 15, the universal joint 46, the input shaft 41, and the output shaft 42 provided with the pinion 30), the rack shaft 50 having the rack teeth 50a, the coupling rod 52, and the rotating wheel 16 from the steering wheel 12.

Through such configuration, when the steering wheel 12 is steered, a normal rack and pinion steering operation can be performed, and the steering wheel 12 can be operated to steer the rotating wheel 16, thereby changing the direction of the vehicle. Here, the rack shaft 50, the rack teeth 50a, and the coupling rod 52 form a steering mechanism in the steering system 18.

As described above, the electric power steering device 10 has the electric motor 24 that provides a steering assist force (also referred to as an assist force) for reducing the steering force of the steering wheel 12.

A resolver 58 detects a rotation angle θrm (also referred to as a motor mechanical angle) of a rotor 23 of the electric motor 24 that integrally rotates with the rotation shaft 25 as a rotation angle θr (also referred to as a motor electrical angle) of the rotor 23 to be supplied to the control device 22 through a wire harness 92. In addition, the resolver 58 is a relative angle detection sensor, but a rotary encoder of an absolute angle detection sensor may be used instead of the resolver 58.

The control device 22 is, for example, a computer including a microcomputer. In addition to a central processing unit (CPU) and a ROM (including an EEPROM) and a random access memory (RAM) used as memories, the control device 22 also has an A/D converter, an input/output device of a D/A converter, etc., a timer used as a timekeeping unit, etc. The CPU implements various functions through reading and executing programs recorded in the ROM.

The control device 22 generates a signal corresponding to the torque Tr from a differential signal of a signal related to the torque Tr output from a detection coil (not shown) of the torque sensor 20 through the wire harness 91.

The control device 22 differentiates the steering angle θs output from the steering angle sensor 19 through the wire harness 91 in the case where the steering angle (also referred to as a rudder angle, a steering angle, or steering wheel angle of the steering shaft 14) θs is provided by the steering angle sensor 19 that is normally operating to generate a steering angular velocity θs' (θs'=dθs/dt, where d is a differential operator and t is time).

The control device 22 further receives an output, that is, a vehicle speed Vs of a vehicle speed sensor 86 through a wire harness 93, and receives an output, that is, a yaw rate Ys of a yaw rate detection device 88 through a wire harness 94.

The electric motor 24 generates the assist torque Ta corresponding to a provided assist current to be given to the output shaft 42 through a retardation transmission mechanism 26, so that the steering shaft 14 generates the steering assist force.

Basically, the electric power steering device 10 is configured and operated as described above to implement steering assistance.

Figure 2:
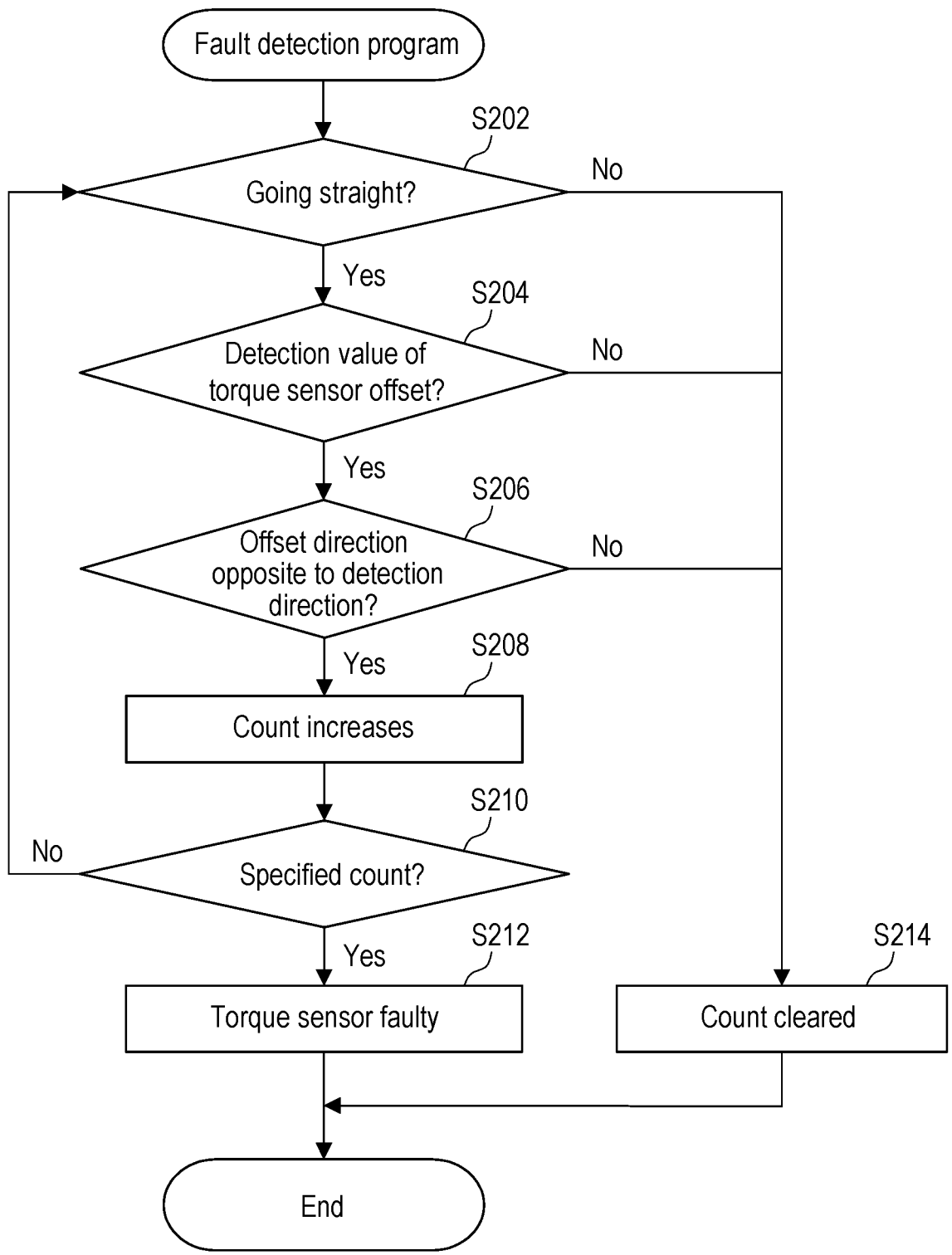
FIG. 2 is a flowchart of a fault detection program of a torque sensor according to an embodiment of the disclosure.

FIG. 2 is a flowchart of a fault detection program of a torque sensor according to an embodiment of the disclosure. Please refer to FIG. 1 and FIG. 2. The fault detection program of the embodiment is applicable to the electric power steering device 10 of FIG. 1. The detailed steps of the fault detection program of the embodiment will be described below in conjunction with each component in the electric power steering device 10.

In Step S202, the control device 22 judges whether the vehicle is going straight according to the yaw rate detection device 88 for detecting the yaw rate Ys of the vehicle, the torque sensor 20, and the vehicle speed Vs of the vehicle detected by the vehicle speed sensor 86. In some embodiments, the control device 22, for example, judges that the vehicle is going straight after judging that the yaw rate Ys of the vehicle is less than a preset value (for example, 0.25), the rudder angle of the vehicle is less than a preset angle (for example, 4 degrees), and the vehicle speed Vs is higher than a preset speed (for example, 20 km/h), but not limited thereto. In other embodiments, the control device 22 may also judge whether the vehicle is going straight by using other values as preset values for judgment or adding other parameters.

In Step S204, the control device 22 judges an offset of the torque sensor 20 according to the steering torque. For example, when a detection value output by the torque sensor 20 is a positive value, it is judged that the torque sensor 20 is offset to the right; and when a detection value output by the torque sensor 20 is a negative value, it is judged that the torque sensor 20 is offset to the left.

In the judgement of the offset, a torque detection range of the torque sensor 20 is set to include a first direction offset to one side and a second direction offset to another side from a torque midpoint of the detection value of the torque sensor 20. The first direction is, for example, the right direction and the second direction is, for example, the left direction, but not limited thereto.

In Step S206, the control device 22 judges whether a direction in which the steering torque is generated is opposite to a detection direction within the torque detection range. The control device 22, for example, obtains the steering angle from the steering angle sensor 19 in the torque sensor 20, and compares the steering angle with a predetermined torque detection range to judge the detection direction within the torque detection range. If the rudder angle is within the torque detection range, the direction of the rudder angle is taken as the detection direction. If the direction of the steering torque is opposite to the detection direction within the torque detection range, proceed to Step S208. The control device 22 increases a count for judging whether the torque sensor is faulty.

Conversely, if the direction of the steering torque is opposite to the detection direction within the torque detection range, proceed to Step S208. The control device 22 increases the count for judging whether the torque sensor is faulty, and in Step S210, judge whether an accumulated count is greater than a specified count.

If the accumulated count is greater than the specified count, in Step S212, the control device 22 judges that the torque sensor 20 is faulty, and ends the fault detection program. At this time, the control device 22, for example, turns on a warning light to indicate that the torque sensor 20 is faulty or activates a backup control when the torque sensor 20 is faulty, so as to implement electric power steering (EPS) assistance that does not continue the unbalanced state of the steering force.

On the contrary, if the accumulated count is not greater than the specified count, return to Step S202 for the next judgement. In addition, if it is judged in Step S202 that the vehicle is not going straight, it is judged in Step S204 that the detection value of the torque sensor 20 does not offset, or it is judged in Step S206 that the direction in which the steering torque is generated is opposite to the detection direction within the torque detection range, proceed to Step S214. The control device 22 clears the accumulated count, and ends the fault detection program.

Figure 3:
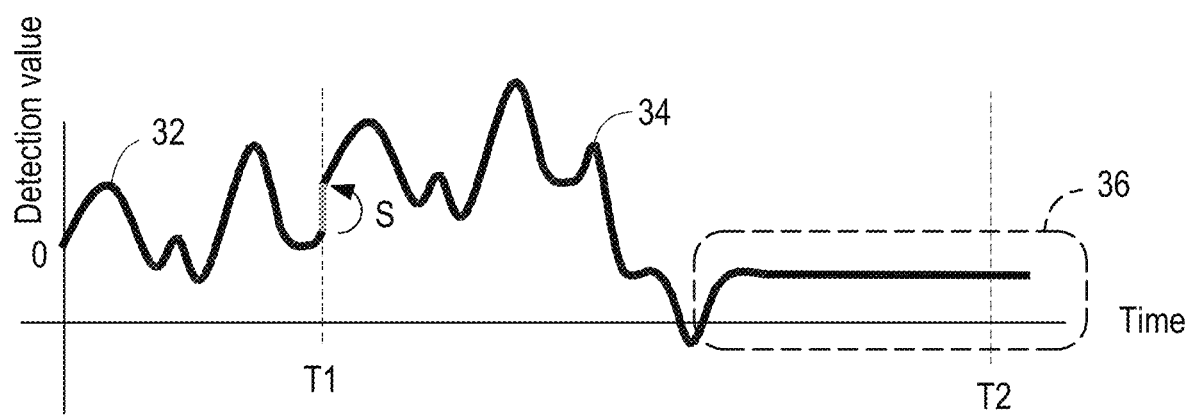
FIG. 3 is a variation graph of detection values of a torque sensor according to an embodiment of the disclosure.

FIG. 3 is a variation graph of detection values of a torque sensor according to an embodiment of the disclosure. Please refer to FIG. 3. Curves 32 and 34 respectively show the detection values obtained by the torque sensor detecting the steering torque during periods 0 to T1 and T1 to T2, wherein at the time point T1, that is, at the intersection of the curves 32 and 34, the vehicle starts to travel on an inclined road. At this time, due to the misalignment of the magnet, the detection value of the torque sensor offsets (that is, the torque midpoint offsets). The curve 34 maintains a constant value within a region 36 after changing for a period of time, which means that the vehicle is going straight on the inclined road. Usually, when the vehicle is going straight, the detection value of the torque sensor should be zero, but the detection value of the curve 34 within the region 36 maintains at a negative value, it can be known that the direction in which the steering torque is generated is opposite to an offset direction of the detection value of the torque sensor, so it may be judged that the torque sensor is faulty.

Through the above method, if the direction in which the steering torque is generated is opposite to the offset direction of the detection value of the torque sensor 20, it may be judged that the torque sensor 20 is faulty, but if the two are in the same direction, when driving on the inclined road, the torque sensor 20 is judged to be normal, without being mistakenly detected to be faulty.

Figure 4:
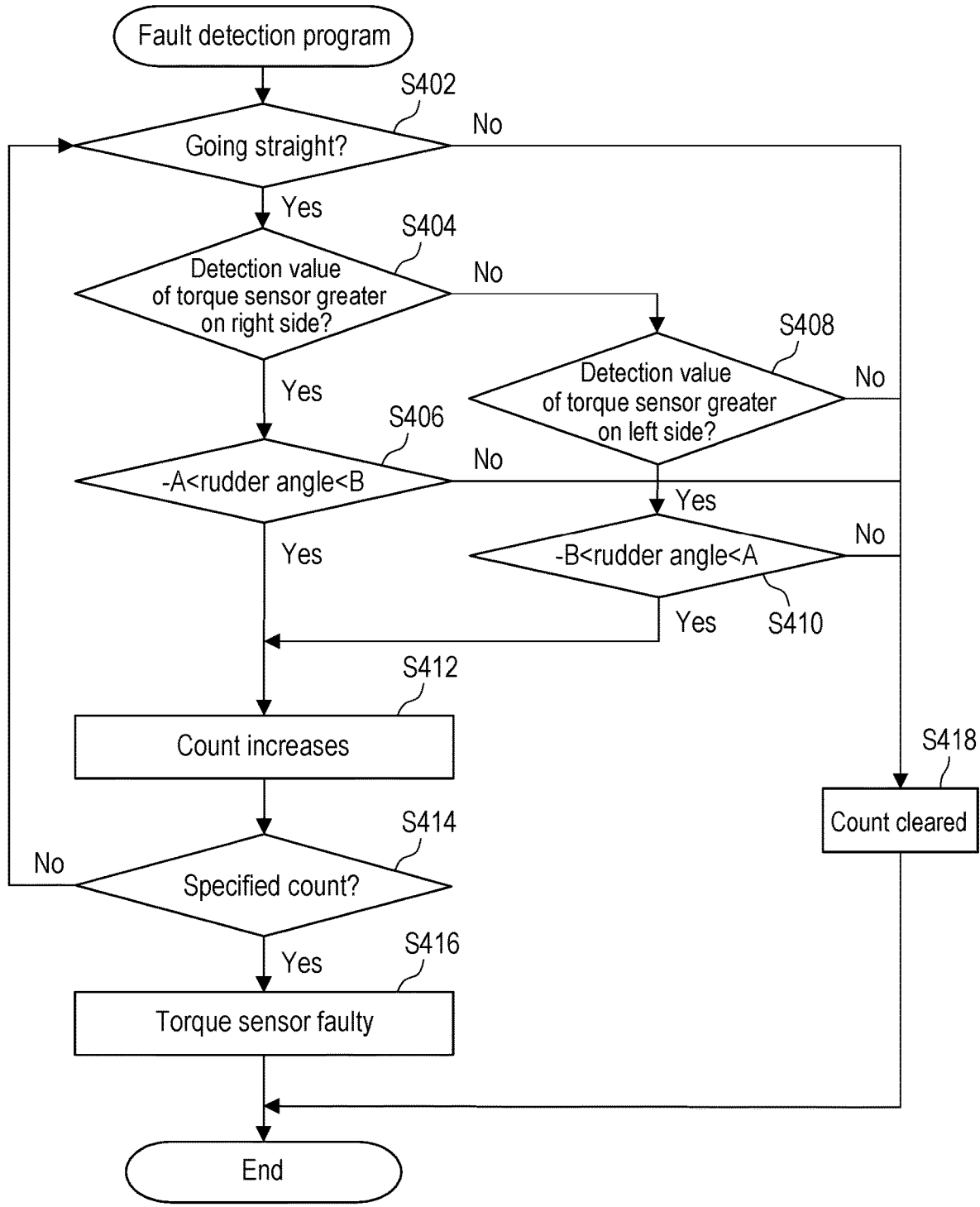
FIG. 4 is a flowchart of a fault detection program of a torque sensor according to an embodiment of the disclosure.

FIG. 4 is a flowchart of a fault detection program of a torque sensor according to an embodiment of the disclosure. Please refer to FIG. 1 and FIG. 4. The fault detection program of the embodiment is applicable to the electric power steering device 10 of FIG. 1. The detailed steps of the fault detection program of the embodiment will be described below in conjunction with each component in the electric power steering device 10.

In Step S402, the control device 22 judges whether the vehicle is going straight according to the yaw rate detection device 88 for detecting the yaw rate Ys of the vehicle, the torque sensor 20, and the vehicle speed Vs of the vehicle detected by the vehicle speed sensor 86. The implementation manner of judging whether the vehicle is going straight is the same as or similar to Step S202 of the foregoing embodiment, so the details thereof will not be repeated here.

Different from the foregoing embodiment, this embodiment adds a rudder angle condition as a countermeasure against misdetection on an inclined road. Since the steering is executed on the opposite side of the offset direction, the twist of the torque sensor 20 and the rudder angle condition on the opposite side of the torque sensor 20 increase. That is, after judging that the vehicle is going straight, the control device 22 sets the corresponding torque detection range according to the offset direction of the detection value of the torque sensor 20, and judges whether the torque sensor 20 is faulty according to whether the steering angle detected by the steering angle sensor 19 falls within the torque detection range.

Specifically, in Step S404, the control device 22 judges whether the detection value of the torque sensor 20 is greater on the right side, that is, offset to the right. If the control device 22 judges that the detection value of the torque sensor 20 is not greater on the right side, in Step S410, it is judged whether the detection value of the torque sensor 20 is greater on the left side, that is, offset to the left.

If the control device 22 judges that the detection value is greater on the right side, in Step S408, the control device 22 judges whether the rudder angle is within the torque detection range (that is, between −A and B, where A and B are arbitrary numbers, and A is greater than B). If the control device 22 judges that the detection value is greater on the left side, in Step S412, the control device 22 judges whether the rudder angle is within another torque detection range (that is, between −B and A).

For example, when the control device 22 judges that the detection value of the torque sensor 20 is a positive value and greater than a predetermined value, it is judged whether the rudder angle is between −4 degrees and 2 degrees (that is, the rudder angle condition on the opposite side increases); and when the control device 22 judges that the detection value of the torque sensor 20 is a negative value, it is judged whether the rudder angle is between −2 degrees and 4 degrees (similarly, the rudder angle condition on the opposite side increases).

If the control device 22 judges that the vehicle is not going straight in Step S402, judges that the detection value is not greater on the left side in Step S408, judges that the rudder angle is not within the torque detection range in Step S408, or judges that the rudder angle is not within another torque detection range in Step S412, in Step S418, an accumulated count is cleared, and the fault detection program ends.

If the control device 22 judges that the rudder angle is within the torque detection range in Step S406 or judges that the rudder angle is within another torque detection range in Step S410, in Step S412, the control device 22 increases a count for judging whether the torque sensor is faulty, and in Step S414, it is judged whether the accumulated count is greater than a specified count.

If the control device 22 judges that the accumulated count is greater than the specified count, in Step S416, it is judged that the torque sensor 20 is faulty, and the fault detection program is ended, and if the control device 22 judges that the accumulated count is not greater than the specified count, return to Step S402 for the next judgment.

Through the above method, when going straight on the inclined road, due to the inclination of the road surface, the torque sensor 20 turns to the direction opposite to the offset direction, and through correcting the detection value to the side of the torque midpoint, the accuracy of the fault detection of the torque sensor 20 on the inclined road is improved.

In some embodiments, the control device 22 does not execute fault detection of the torque sensor 20 when the yaw rate detected by the yaw rate detection device 88 is equal to or higher than a preset threshold value. In detail, when the yaw rate detection device 88 detects that the yaw rate is equal to or higher than the preset threshold value (for example, exceeding 0.25 degrees/second), the vehicle is determined to be in a turning state (for example, driving on a curved road). At this time, the calculation load of the control device 22 can be reduced through stopping the fault detection of the torque sensor 20.

In summary, the torque sensor fault detection method of the disclosure can judge whether the torque sensor is faulty through judging whether the direction of the steering torque is opposite to the detection direction of the torque sensor. Through adding the rudder angle condition in the judgment, misdetection on the inclined road may be further prevented. When it is judged that the torque sensor is faulty, the warning light may be turned on, so that the driver may identify the fault and perform maintenance, or the EPS assistance that does not continue the unbalanced state of the steering force can be implemented through activating the backup control that does not need to use the torque sensor, so as to prevent or reduce the impact of the fault of the torque sensor on driving.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A torque sensor fault detection method, applicable to a control device with electric power steering equipped with a torque sensor, wherein the torque sensor detects a steering torque and a rudder angle according to an operating amount of a steering disposed on a vehicle, the torque sensor fault detection method comprising:
   judging whether the vehicle is going straight according to a yaw rate detection device for detecting a vehicle yaw rate, the torque sensor, and a vehicle speed of the vehicle by the control device;
   judging an offset of the torque sensor by the steering torque according to a detection value of the torque sensor when the vehicle is judged as going straight,
   wherein in judgement of the offset, a torque detection range of the torque sensor is set to comprise an offset of a first direction to one side and an offset of a second direction to another side from a torque midpoint of the detection value of the torque sensor, wherein
   when the detection value of the torque sensor is in the first direction, the offset of the second direction is greater than the offset of the first direction in the torque detection range; and
   when the detection value of the torque sensor is in the second direction, the offset of the first direction is greater than the offset of the second direction in the torque detection range;
   judging whether the rudder angle is within the torque detection range; and
   judging that the torque sensor is faulty when the rudder angle is within the torque detection range.

2. The torque sensor fault detection method according to claim 1, comprising:
   not executing fault detection of the torque sensor by the control device when the yaw rate detection device detects that the yaw rate is equal to or higher than a threshold value.

* * * * *